3,515,510
RECOVERY OF ZINC VALUES FROM SULFIDE ORES
Ernest A. Winter, College Park, Ga., William A. Satterwhite, Lakeland, Fla., and Richard L. Meek, Atlanta, Ga., assignors to Tennessee Corporation, New York, N.Y., a corporation of Delaware
No Drawing. Filed Dec. 28, 1967, Ser. No. 700,314
Int. Cl. C01g 9/00
U.S. Cl. 23—55                                             14 Claims

ABSTRACT OF THE DISCLOSURE

Roasted zinc sulfide ore is heated in the presence of a reducing agent in order to reduce the zinc ferrite formed in the roasting operation from the ferric to the ferrous state. The ore is thereafter leached with an alkaline solution in order to extract a very high percentage of the zinc values as an alkaline zincate solution. Only trace amounts of the iron and manganese present in the sulfide ore are dissolved in the alkaline solution.

BACKGROUND OF THE INVENTION

Field of the invention

This invention relates to the recovery of the zinc values from sulfide ores. More particularly, it relates to the recovery of the zinc values from the zinc ferrite formed in the roasting of zinc sulfide ores.

Description of the prior art

The roasting of zinc sulfide ores is well known in the art. The resulting zinc oxide is commonly leached with an aqueous sulphuric acid solution. A zinc sulphate solution is obtained that may be purified and subjected to electrolysis in order to recover the zinc from solution. It is highly desirable from an economic viewpoint that the recovery of zinc from the sulfide ore be maximized. The presence of iron in the ore, however, adversely affects the recovery of zinc in this conventional operation.

During roasting, at least a portion of the iron in the sulfide ore combines with zinc to form zinc ferrite. Conventional leaching of the roasted ore does not extract the zinc from the zinc ferrite, which is not soluble in the sulphuric acid solution. Zinc recoveries, therefore, are lowered by the formation of zinc ferrites during the roasting operation.

It is an object of the present invention, therefore, to provide an improved process for the recovery of zinc from iron-containing sulfide ores.

It is another object of the present invention to provide a process for the recovery of the zinc that combines with iron to form zinc ferrite during the roasting of zinc sulfide ores.

It is another object of the present invention to provide a process in which the recovery of zinc from sulfide ores is maximized while contamination of the resulting product with iron and other impurities is minimized.

These and other objects of the present invention are accomplished by means of the present invention as hereinafter disclosed, the novel features of which are set forth in the appended claims.

SUMMARY OF THE INVENTION

In the present invention, the zinc sulfide ore is roasted under oxidizing conditions in accordance with conventional practice. During such roasting, the iron present in the ore combines with a portion of the zinc to form zinc-iron compounds which as zinc ferrite, i.e. $ZnFe_2O_4$. The remainder of the zinc sulfide ore is converted to zinc oxide. Prior to the leaching operation, the roasted ore is heated in the presence of a reducing agent so as to reduce the ferric iron to the ferrous state, thus destroying the zinc ferrites formed during the initial roasting operation period. An alkaline solution, such as a caustic soda solution, is thereafter employed in order to extract the zinc from the thus roasted and reduced ore. Exceptionally high zinc recoveries are thus obtained, with only trace amounts of iron and other impurities, such as manganese, dissolved in the leaching solution. The trace amounts of impurities can readily be removed, and the purified solution can be treated by known techniques in order to produce zinc metal.

DETAILED DESCRIPTION OF THE INVENTION

The present invention permits exceptionally high recoveries of zinc from zinc sulfide ores, or concentrates thereof, while minimizing contamination of the product with the iron and other impurities, such as manganese, contained in the ore. Recoveries of up to 97% of the zinc content of the sulfide ore have been obtained by means of the present invention, as opposed to recoveries on the order of 80% by conventional roasting and sulphuric acid extraction. This increase results from the recovery of the zinc from the zinc ferrites that are formed in the conventional roasting of iron-containing zinc sulfide ores. The zinc ferrites are not soluble in the conventional sulphuric acid leaching solution and are thus lost to the process.

The roasting step of the present invention is a conventional one for the conversion of zinc sulfide to zinc oxide. The sulphur in the sulfide is driven off as sulphur dioxide. In order to accomplish the desired conversion to zinc oxide, it is necessary that the roasting operation be carried out at elevated temperatures under oxidizing conditions. A free oxygen containing gas, such as air, is typically employed for this purpose.

While the temperature employed during the initial roasting operation is not critical, temperatures within the range of from about 1400° F. to about 2000° F. are commonly employed. More particularly, temperatures within the range of from about 1650° F. to about 1750° F. are commonly employed.

The initial roasting operation can be carried out in a variety of well-known, commercially available roasters. For example, the roasting operation may be carried in a rotary kiln, a conventional fluo-solids reactor, a multiple hearth, and the like. There is also within the scope of the present invention to utilize double unit roasters in which the first unit may be employed for the roasting operation, while the second unit is utilized for the subsequent reduction operation.

During the roasting operation, at least some of the iron present in the zinc sulfide ore, or concentrates thereof, combines with zinc to form zinc-iron compounds such as zinc ferrite. The zinc values in this ferrite material cannot be successfully extracted and recovered by conventional leaching techniques. In accordance with the present invention, the roasted ore is heated in the presence of a reducing agent in order to reduce the iron in the zinc-iron combination from the ferrite to the ferrous state. As hereinafter more fully described, this destruction of the ferrites followed by the leaching operation herein described permits the recovery of the zinc values from the zinc ferrite formed during the initial roasting operation. Of particular significance is the fact that the zinc recovered from the ferrite material by means of the present invention is not contaminated by significant quantities of iron and other impurities. On the contrary, the present invention permits the recovery of the zinc values found in the ferrite material as a zincate solution substantially free of iron, manganese and other impurities which heretofore have not been readily separable from the zinc in the zinc ferrite material.

During the reduction operation, the roasted ore is maintained at an elevated temperature, generally within the range of from about 1000° F. and about 1600° F. A temperature within the range of from about 1200° F. and about 1400° F. may be conveniently employed.

A variety of well-known, readily available reducing agents may be employed for the reduction of the iron in the zinc ferrite from the ferric to the ferrous state. Illustrative of such reducing agents are carbon monoxide, hydrogen, coal, and hydrocarbon oils. A mixture of two or more reducing agents may also be employed. For example, reformer gas or other gases containing hydrogen and carbon monoxide alone or mixed with inert gases may readily be employed. While the amount of reducing agent employed in the production of the roasted zinc sulfide is not a critical feature of the invention, a reducing agent or combination of reducing agents will ordinarily be employed in a quantity corresponding to from about 50% to about 1000% of that theoretically required, on a stoichiometric basis, for the reduction of all of the iron present in the zinc sulfide ore from the ferric to the ferrous state. It has been found particularly suitable to employ from about 150% to about 250% of the theoretical amount of reducing agent necessary to accomplish the desired reduction. The reduction operation can be carried in any suitable equipment in which the roasted ore and the reducing agent may be adequately contacted at elevated temperatures. The equipment employed in the initial roasting operation can conveniently be employed in the reduction operation. As indicated above, readily available double unit roasters can be used to advantage, with one unit being employed for the roasting operation and the other employed for the reduction operation.

The thus roasted and reduced ore is thereafter leached to extract the zinc values from the ore. An alkaline solution is employed in order to extract the zinc without likewise dissolving appreciable quantities of iron, manganese, and other impurities. A caustic soda solution is generally preferred as a leaching solution. Other alkaline solutions, however, may also be employed, e.g., calcium hydroxide and ammonium carbonate.

As those skilled in the art will readily appreciate, the concentration of the leaching solution will be subject to certain practical limitations although the concentration as such is not a critical feature of the invention. A caustic soda solution, for example, will ordinarily be employed at a concentration within the range of from about 20% to about 35% NaOH by weight, typically from about 25% to about 28%. If a concentration of less than about 20% were employed, the leaching vessel would have to be proportionately larger in order to accommodate the larger volume of leaching solution without any compensating operating advantage. In addition, unnecessary and excessive dilution of the leaching solution makes necessary a subsequent concentration of the resulting alkaline zincate solution to obtain the preferred concentration range primarily desired for the subsequent electrolytic recovery of zinc. If, on the other hand, the concentration of the caustic soda exceeds about 35%, the solution tends to become somewhat viscous, resulting in a lowering of the overall recovery of zinc in solution.

The leaching operation is continued for a sufficient time to assure the satisfactory extraction of the zinc from the roasted and reduced zinc sulfide ore. The leaching time is not an essential feature of the present invention but will vary depending upon the particular leaching solution employed, its concentration, and the temperature at which the leaching operation is carried out. The temperature employed may range from ambient temperature up to the boiling point of the leaching solution. When a caustic soda solution is employed, temperatures within the range of from about 150° F. and about 230° F. are conveniently employed.

The product of the present invention is an alkaline zincate solution containing an exceptionally high percentage of the zinc values contained in the sulfide ore being treated. Moreover, only trace amounts of the iron, manganese and other impurities in the ore are dissolved by the leaching solution. Previous efforts to recover the zinc from the zinc ferrite have suffered the disadvantage of also dissolving a significant portion of the iron as well. The trace amount of impurities found in the alkaline zincate solution of the present invention can readily be removed by techniques well-known in the art. The trace amounts of manganese, for example, may be removed from the zincate solution by oxidation. The trace amounts of iron can be removed along with any other heavy metal impurities by concentration and precipitation with zinc dust. Since such techniques do not constitute an essential part of this invention, they are not described herein in detail. Following purification, the alkaline zincate solution can be treated by conventional methods in order to recover zinc. The purified solution can, for example, be subjected to electrolysis for the electrodeposition of substantially pure zinc.

The following examples demonstrate the beneficial results obtainable by means of the present invention. It will be readily understood that the examples are presented only for purposes of illustration and are not to be construed as limiting in any way the scope of the invention herein described.

EXAMPLE I

A zinc sulfide concentrate containing 53.0% zinc, 32.5% sulphur, 9.60% iron and 0.50% manganese was roasted in the presence of air at 1800° F. Essentially all of the sulphur in the sulfide was expelled as sulphur dioxide. The resulting calcine was then heated in the presence of a mixture of hydrogen and carbon monoxide to reduce the ferric iron contained therein to the ferrous state. The reduced calcine was then treated with 27½% caustic soda solution for one hour at 200° F. The resulting slurry was filtered, and the alkaline zincate solution was found to contain 97.1% of the zinc content of the sulfide. The solution contained only 0.046 gram of iron per liter and 0.015 gram of manganese per liter.

EXAMPLE II

A series of runs were made in which a variety of zinc sulfides were roasted in accordance with conventional techniques and the resulting calcines were contacted at elevated temperatures with varying amounts of a reducing atmosphere containing 28% reductants comprising a mixture of carbon monoxide and hydrogen. The roasted and reduced sulfide material was then leached with a 27% NaOH solution in accordance with the present invention. The results are set forth in the following table.

TABLE—ZINC RECOVERY

| Sample | Percent theoretical reductant | Leachable Zn (per 100 gm. calcine) | Total Zn (per 100 gm. calcine) | Percent Zn recovery |
| --- | --- | --- | --- | --- |
| 1 | 0 | 55.02 | 61.74 | 89.1 |
| 2 | 45 | 57.12 | 62.18 | 91.9 |
| 3 | 115 | 59.19 | 62.43 | 94.8 |
| 4 | 205 | 59.90 | 62.40 | 96.0 |
| 5 | 430 | 60.62 | 62.94 | 96.3 |
| 6 | 900 | 61.28 | 63.40 | 96.7 |
| 7 | 0 | 48.92 | 55.92 | 87.5 |
| 8 | 70 | 50.92 | 56.24 | 90.5 |
| 9 | 145 | 52.98 | 56.50 | 93.8 |
| 10 | 300 | 53.06 | 56.02 | 94.7 |
| 11 | 640 | 53.28 | 55.74 | 95.6 |

Impurities in Zincate solution

| Sample | Iron leached (gm./liter) | Manganese leached (gm./liter) |
| --- | --- | --- |
| 1 | 0.0092 | 0.004 |
| 2 | 0.021 | 0.029 |
| 3 | 0.0093 | 0.030 |
| 4 | 0.0311 | 0.063 |
| 5 | 0.0081 | 0.048 |
| 6 | 0.058 | 0.031 |
| 7 | 0.027 | 0.044 |
| 8 | 0.030 | 0.062 |
| 9 | 0.013 | 0.081 |
| 10 | 0.031 | 0.025 |
| 11 | 0.069 | 0.019 |

Residue

| Sample | Wt. of residue (per 100 gm. calcine) | Zinc in residue (per 100 gm. calcine) | Iron in residue (per 100 gm. calcine) | Ratio zinc/iron in residue |
| --- | --- | --- | --- | --- |
| 1 | 30.0 | 6.72 | 11.40 | 0.589 |
| 2 | 27.8 | 5.06 | 11.18 | 0.453 |
| 3 | 26.5 | 3.24 | 10.80 | 0.300 |
| 4 | 26.6 | 2.50 | 11.18 | 0.224 |
| 5 | 27.6 | 2.32 | 11.54 | 0.201 |
| 6 | 27.0 | 2.12 | 11.24 | 0.189 |
| 7 | 37.6 | 7.00 | 11.70 | 0.598 |
| 8 | 36.0 | 5.32 | 11.74 | 0.453 |
| 9 | 33.8 | 3.52 | 11.56 | 0.304 |
| 10 | 35.2 | 2.96 | 11.40 | 0.260 |
| 11 | 36.0 | 2.46 | 11.16 | 0.220 |

It should be noted that the zinc/iron ratio for theoretically complete conversion of the zinc and iron in the residue to zinc ferrite is 0.585. As shown by the zinc recovery data, the present invention provides a means for achieving substantial recoveries of zinc from roasted sulfide ores. In the treatment of samples 1 and 7, no reduction of the iron in the roasted ore from the ferric to the ferrous state was included. The zinc recovery, it will be noted, was less than that obtained from samples 2–6 and 8–11 which were treated in accordance with the present invention. At the same time, the amount of iron and manganese extracted by the leaching solution remained at a very low level. Contamination of the resulting zincate solution is limited, therefore, to trace amounts.

The data also shows the corresponding reduction in the zinc/iron ratio in the residue that occurs when the roasted ore is treated in accordance with the present invention. In samples 1 and 7 in which the reduction operation was omitted, the zinc/iron ratio corresponds to that occurring when the iron in the sulfide ore combines with a portion of the zinc to form zinc ferrite. In the case of the samples treated in accordance with the present invention, however, the zinc/iron ratio is decreased, indicating that substantial amounts of zinc otherwise lost in the ferrite material is being recovered.

The present invention, therefore, results in an increased recovery of zinc from iron-containing sulfide ores. This increased recovery, over conventional techniques, results from the extraction of the zinc values that combine with iron during the roasting of the sulfide ore so as to form zinc ferrite material. Conventional operations are either not successful in recovering the zinc from this ferrite material or result in the extraction not only of the zinc but of the iron and other impurities as well. The alkaline zincate solution of the present invention, on the other hand, not only contains a high percentage of the zinc values, but contains only trace amounts of iron and manganese impurities. A high recovery of pure zinc metal may readily be obtained, therefore, from iron-containing sulfide ores by the process set forth herein and in the appended claims.

It will readily be appreciated by those skilled in the art that various changes and modifications can be made in the practice of the present invention without departing from the scope of the invention as described herein with reference to particular embodiments thereof:

Therefore, we claim:

1. A process for the recovery of the zinc values from zinc sulfide ores having iron values present therein comprising:
    (a) roasting the zinc sulfide ore under oxidizing conditions so as to drive off the sulphur values thereof as sulphur dioxide and to convert at least a major portion of the zinc to zinc oxide, a lesser proportion of the zinc combining with the iron value of said ore to form zinc-iron compounds;
    (b) contacting the thus reduced ore with a reducing agent at an elevated temperature so as to reduce the iron values in said roasted ore from the ferric to the ferrous state;
    (c) leaching the thus roasted and reduced ore with an alkaline solution to extract the zinc values therefrom as an alkaline zincate solution,
whereby the recovery of zinc from said zinc sulfide ores is maximized with minimum contamination of the resulting alkaline zincate solution with iron and other impurities.

2. The process of claim 1 in which the roasting operation is carried out at a temperature in the range from about 1400° F. and about 2000° F.

3. The process of claim 2 in which the roasting temperature is between about 1650° F. and about 1750° F.

4. The process of claim 1 in which the temperature during the reducing operation is maintained at from about 1000° F. and about 1600° F.

5. The process of claim 4 in which the reducing temperature is between about 1200° F. and 1400° F.

6. The process of claim 1 in which the quantity of reducing agent employed during the reduction of the roasted zinc sulfide is within the range of from about 50% to about 1000% of that theoretically required for the reduction of all of the iron present from the ferric to the ferrous state.

7. The process of claim 6 in which the quantity of reducing agent is between about 150% and about 250% of the theoretical amount.

8. The process of claim 1 in which the reducing agent is selected from the group consisting of hydrogen, carbon monoxide, coal, hydrocarbon oils and combinations thereof.

9. The process of claim 1 in which the alkaline solution is taken from the group consisting of sodium hydroxide, potassium hydroxide, and ammonium carbonate.

10. The process of claim 9 in which the alkaline solution is sodium hydroxide.

11. The process of claim 10 in which the concentration of sodium hydroxide is between about 20% and about 35% by weight of the alkaline solution.

12. The process of claim 11 in which the sodium hydroxide concentration is between about 25% and about 28% by weight of the alkaline solution.

13. The process of claim 1 in which the temperature during the leaching operation is maintained between ambient temperature and the boiling point of the alkaline solution.

14. A process for the recovery of the zinc values from zinc sulfide ores having iron values present therein comprising:
    (a) roasting the zinc sulfide ore at from about 1400° F. to about 200° F. under oxidizing conditions so as to drive off the sulphur values thereof as sulphur dioxide and to convert at least a major proportion of the zinc to zinc oxide, a lesser proportion of the zinc combining with the iron value of said ore to form zinc-iron compounds;

(b) contacting the thus roasted ore at a temperature of from about 1000° F. and about 1600° F. with a reducing agent, said reducing agent having present in an amount that is within the range of from about 50% to about 1000% of that theoretically required for the reduction of all of the iron present from the ferric to the ferrous state;

(c) leaching the thus roasted and reduced ore with a caustic soda solution at a concentration at from about 20% to about 35% by weight of the solution, whereby the recovery of zinc from said zinc sulfide ore is maximized with minimum contamination of the resulting alkaline zincate solution with iron and other impurities.

References Cited

UNITED STATES PATENTS

| | | | |
|---|---|---|---|
| 1,023,964 | 4/1912 | Ranson | 23—55 |
| 1,167,700 | 1/1916 | Laist et al. | 75—120 |
| 1,477,478 | 12/1923 | Elton et al. | 75—120 |
| 3,113,860 | 12/1963 | Pagel | 75—120 X |
| 3,434,798 | 3/1969 | Menendez et al. | 75—120 X |

FOREIGN PATENTS 746,633  3/1956  Great Britain.

EDWARD J. MEROS, Primary Examiner

U.S. Cl. X.R.

75—120